Dec. 12, 1950     C. R. SACCHINI     2,533,963
DRIVE ARM MECHANISM
Filed July 12, 1944     2 Sheets-Sheet 2
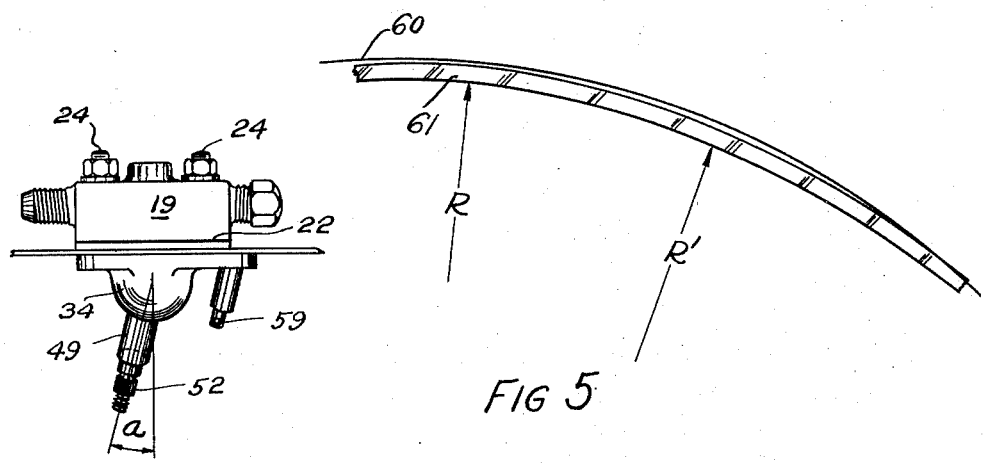
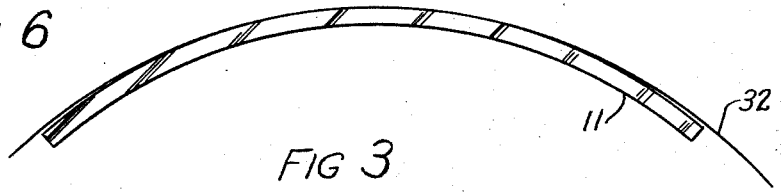
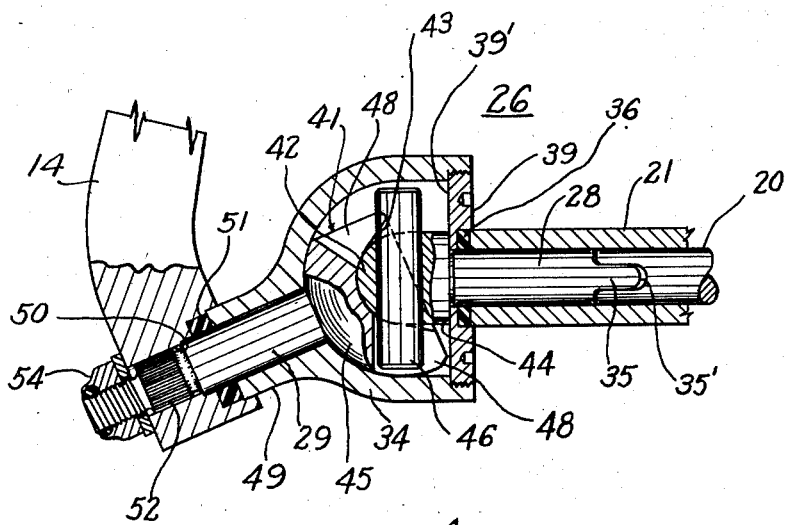
INVENTOR.
COLUMBUS R. SACCHINI
BY
George M. Soule
ATTORNEY Patented Dec. 12, 1950

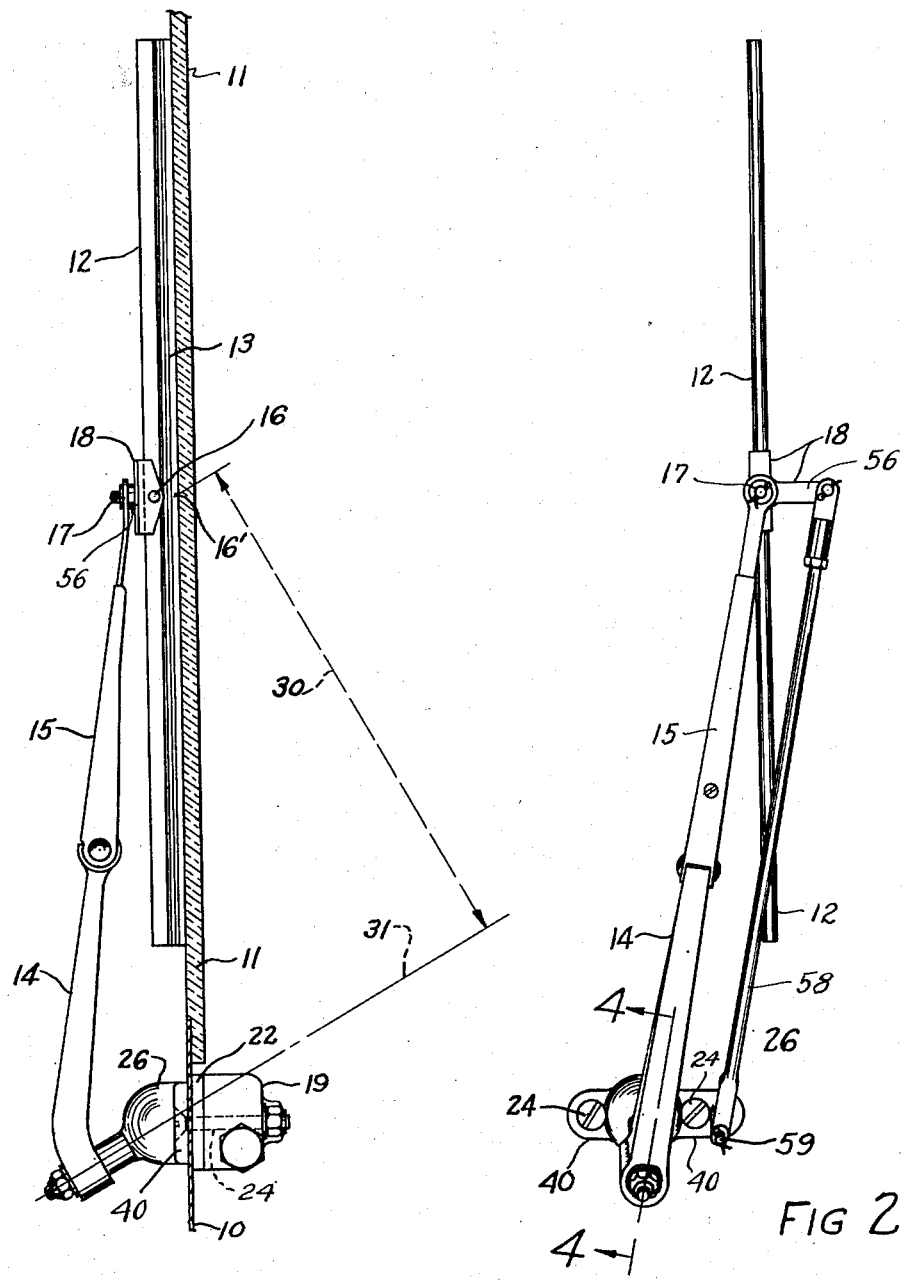

2,533,963

UNITED STATES PATENT OFFICE 2,533,963

DRIVE ARM MECHANISM

Columbus R. Sacchini, Willoughby, Ohio, assignor to The Marquette Metal Products Company, Cleveland, Ohio, a corporation of Ohio Application July 12, 1944, Serial No. 544,593

4 Claims. (Cl. 15—251)

This invention relates to an arm driving means, and more particularly to an arm driving means useable, by way of example, for oscillatably moving a wiping element or blade of a window or windshield wiping mechanism in an arcuate path which is transverse to the plane of swinging movement of the arm.

Windshield wiping mechanisms for operating upon curved surfaces are known in which a power take-off shaft of a power supply unit, i. e. a motor or motion converter, is obliquely positioned relative to the principal plane of the curved surface. By "principal plane" as herein used is meant that plane which is tangent to the curved surface substantially at the mid-portion of wiper blade travel. Since the proper degree of angularity of the power take-off shaft with respect to the principal plane of the curved surface is a complicated function of the degree of curvature of the surface and must be accurately predetermined and maintained, it has heretofore, usually if not always, been necessary to design and construct a special power supply unit for each different curved surface to be operated upon.

Attempts have been made to mount a standard power supply unit so that the power output shaft thereof, although normal to the mounting face of the unit, is oblique with respect to the principal plane. However, such procedure has led to serious installation difficulties. Usually it is a formidable task to discover the proper mounting angle and, when such angle has been determined, the problem is presented of securing the unit properly in position with its mounting face disposed in a plane transverse to the principal plane.

In accordance with this invention advantage is taken of the fact that, in almost all instances, the curved surface to be wiped and an adjacent surface of its supporting structure are coaxial. This relationship is particularly true in the case of streamlined vehicle construction. The power supply unit is mounted on the coaxial portion of the supporting structure in the manner usual for planar surface wiping installations, and therefore has its power take-off shaft normal to the principal plane of the curved surface. Power transmission means is operatively interposed between the power take-off shaft and the wiper blade drive arm to provide the desired angularity between the driving shaft for the drive arm and the principal plane. The power transmission means may conveniently be a universal joint of simple design having a predetermined angularity between its input and output shafts. By virtue of such construction the power supply unit may be of standard design regardless of the degree of curvature of the surface to be wiped and it is only necessary to select a universal joint having the proper inter-shaft angularity to provide the desired operation.

An object of this invention is to provide an improved means for driving an arm in an arcuate path which is transverse to the plane of swinging movement of the arm.

Another object is to provide an improved means for operating a drive arm of a wiper element so that said element wipes a surface of predetermined curvature.

Another object is to provide independent means interposed between a drive arm and a power supply unit for the arm which means causes the arm to follow an arcuate path transverse to the swinging movement of the arm.

Another object is to provide an improved and simplified supporting and operating mechanism for a drive arm of a wiper element arranged to wipe a curved surface and motivated by a power supply unit which may be of standard design mounted with its power take-off shaft normal to the principal plane of the curved surface.

A more specific object is to interpose a universal joint between the power supply unit and drive arm of a wiper mechanism for causing the wiping element of said mechanism to follow a curved surface.

Other objects and advantages of this invention will become apparent from the following description wherein reference is made to the drawings, in which:

Fig. 1 is an elevational side view of a wiper driving assembly and associated fragmentary parts of a supporting body such as a land vehicle or airship;

Fig. 2 is an elevational front view of the wiper driving assembly and body parts of Fig. 1;

Fig. 3 is a diagram illustrating the principle of operation;

Fig. 4 is a fragmentary view similar to Fig. 1 but partially in section along the line 4—4 of Fig. 2;

Fig. 5 is a view similar to Fig. 3 showing a member to be wiped and having a surface of compound curvature; and Fig. 6 is a plan view of a wiper driving unit employing the principles hereof in modified form appropriate for use with such compound curved surfaces.

The illustrated forms and proposed uses of the present invention are by way of example only.

Terms such as vertical, horizontal, front, rear, etc. used either in the specification or claims are for clearness of description only and not by way of limitation.

Referring to the drawings, a body wall member 10 of, for instance, a vehicle has mounted thereon or associated therewith in a suitable manner a curved panel or window 11 to be wiped by a wiper blade 12 shown in an intermediate or mid-stroke wiping position in Fig. 1 and moved slightly out of that position in Fig. 2.

A drive arm 14 for the wiper blade 12 having a squeegee portion 13 is shown connected to said blade as by a wiper arm element 15 of any suitable form, but which is preferably spring-biased in a well known manner to force the blade 12 toward the panel 11. The blade 12 is suitably pivoted at 16 in a bracket or saddle 18 secured as by a pivot pin 17 to the wiper arm element 15. The curved surface of the panel 11 presented to the squeegee 13 may be considered to be cylindrically convex on the side to be wiped, but, as will become apparent hereinafter, this invention is also applicable to conical or spherical surfaces, whether concave or convex. In most instances, practical application would be to that class of surfaces having a single linear axis of gyration.

A power supply unit 19 for the drive arm 14, which unit may be for example a motor or motion converter of known or appropriate design, has an oscillatably driven power take-off shaft 20 (Fig. 4) rotatably supported within a tubular bushing 21 integral with the motor housing of said unit 19 or with a mounting plate 22 of said unit and normal to the mounting surface thereof. The unit 19 may be mounted in any convenient position adjacent the panel 11. As shown, the unit 19 is adapted to be secured as by studs 24 against a portion of the inner surface of the supporting structure which portion is parallel to said principal plane, and therefore the shaft 20 is normal to the principal plane. Generally, this type of mounting is very conveniently obtained in modern vehicle structures.

In order for the shaft 20 to drive the arm 14 in an arcuate path causing the blade 12 to sweep over the curved surface of the panel 11, a separate power transmission means of suitable form is interposed, in accordance with this invention, between the shaft 20 and the drive arm 14. The power transmission means preferably comprises a universal joint assembly or unit 26 having an input shaft 28 disposed at a predetermined angle with respect to an output shaft 29. Depending upon angular disposition of the shaft 20 with respect to the principal plane of the surface of panel 11, the angle between the shafts 28 and 29 is such that a perpendicular (broken line 30, Fig. 1) erected on the extended axis (broken line 31, Fig. 1) of the shaft 29 and passing through the pivot 16 is substantially equal to the radius of gyration of the surface of the panel 11 at a point 16' opposite the pivot 16 when the blade 12 is at the mid-position of its path of travel. With the angularity between the shafts 28 and 29 thus selected, the point 16' of the squeegee 13 upon oscillation of the shaft 29 normally would follow a curved path indicated at 32 in Fig. 3. The path 32 deviates slightly from the true circular section of the panel 11, but the squeegee 13 is held tightly against the surface of the panel 11 by virtue of the spring action provided by the arm element 15 or other equivalent spring means, thereby rendering the slight geometric deviation of no practical consequence.

For purposes of illustration, there is disclosed a universal joint having a generally hemispherical housing 34 into which the mutually engaging ends of the shafts 28 and 29 are received. The input shaft 28 preferably has a tongue and socket type of engagement with the shaft 20 within the tubular bushing 21 so as to permit of slight variations in the length of the shaft 20 and to enable the driving connection between the shafts 20 and 28 to be easily effected. For this purpose the outer end of the shaft 28 is shown as provided with a tongue 35 received within a complementary socket 35' formed as a cross slot in the outer end face of the shaft 20.

The shaft 28 is rotatably supported in the tubular part 21 and is provided with a suitable seal or sealing unit 36 which may be pressed into a central opening in a circular disc-like nut 39. The nut is threaded into an opening in the mounting wall of the housing 34. The housing 34 may be provided with opposing flanges 40 (Fig. 2) provided with appropriate openings for receiving the heads of the studs 24 of the power supply unit 19. An enlarged inner head portion 42 of the shaft 28 defines a shoulder 44 which bears against the inner wall surface 39' of the nut 39 to absorb rearward axial thrust of the shaft 28.

Because of space limitations, and the desirability of minimizing weight as well as bulk, the entire mechanism herein described is usually very small. For example, in a typical installation, the distance from the center of the ball portion of the housing 34 to the outer end of the tubular projection 49 (later described) is less than one inch. Conventional universal joints known as gimbal joints are not adequately strong when made in the small proportions necessitated by the space and other limitations mentioned. Accordingly, the universal joint connection between the shafts 28 and 29 is preferably made as follows:

The inner end face of the head portion 42 is of spherical configuration and is received within a complementary cavity 43 in an inner head portion 45 of the shaft 29, the outer surface of the portion 45 being spherically shaped complementary to the inner wall surface of the housing 34. The head portion 45 is cut away as at 41 at one side only to enable insertion of said head portion into the receiving cavity of the housing 34 through the opening which is closed by the nut 39.

A driving connection between the shafts 28 and 29 is provided by a cylindrical cross pin 46 received in a diametrally disposed opening in the head portion 42 and extending outwardly on opposite sides thereof to be received by slots 48 formed in the inner end face of the head portion 45 on diametrically opposite sides of the cavity 43. The slots are a few thousandths of an inch wider than the diameters of the end portions of the cross pin.

The predetermined angularity between the shafts 28 and 29 is provided by a tubular extension 49 of the housing 34 within which the shaft 29 is rotatably supported on a fixed axis. The outer end of the extension 49 is received within a counterbore of a splined (e. g. serrated) opening 50 in the adjacent end of the drive arm 14 and bears against an annular elastic sealing member 51 disposed at the base of the counterbore and compressed against the walls thereof so that the inner periphery makes a fluid seal with the shaft and one side seals against the outer end of the extension 49. The shaft 29 extends through the opening 50 and has a splined portion 52 complementary to and engaging the splines of the opening. A nut 54 (e. g. "elastic stop nut"), threaded on the outer end of the shaft 29, secures the drive arm 14 in position and serves to force the end of the housing extension 49 against the sealing member 51. By virtue of the sealed construction, including the seal 36, the interior of the housing 34 may be packed with grease to provide trouble free operation for long periods of time.

With the parts thus arranged, it will be clear that operation of the power supply unit 19 causes the shaft 20 to drive the shaft 28 oscillatably through the tongue and slot connection 35, 35', and that the shaft 28, as a result of engagement of the pin 46 with the side walls of the slots 48, drives the shaft 29 and the arm 14 with oscillatory motion. Because of the oblique angle between the shaft 29 and the principal plane of the surface of the panel 11, the arm 14 causes the blade 12 to follow the desired arcuate path as previously described.

In order to guide the wiper blade 12 for wiping movement parallel to the ordinates of the curved surface of the panel 11, a pantograph linkage on the order of that indicated in Fig. 1 or an equivalent "parallelizing" mechanism is required in conjunction with the drive arm 14. The sadddle 18, as previously described, is pivoted to the arm element 15 as by pin 17, and the saddle 18 carries an arm 56 extending transversely of the blade 12 and generally parallel to the panel 11. A link 58 is pivoted to the arm 56 at one end and has a fixed parallel pivot as at 59 on one of the flanges 40, or at some other convenient point, so that, for example, as the blade 12 is moved back and forth over the panel 11 said blade remains parallel to its original position irrespective of the amplitude of swinging movement imparted to the blade. In the case of wiping a frustoconical surface, unless the apex of generation of the surface lies on the axis of the output shaft 29 (in which case no pantograph mechanism would be necessary), then a pantograph linkage operatively similar to that shown is used but with unequal fixed and movable arm lengths as well understood in the art, such as would not maintain parallelism between the drive arm assembly and link 58 when viewed as in Fig. 2 but would cause the blade 12 to be orientated continually with the surface to be wiped.

Referring to Figs. 5 and 6 the former shows at 61 a panel curved on arcs generated by different radii as R and R', the latter being longer radius. When such a panel requires wiping a further deviation of the surface from the arcuate path of a point near the pivot of the blade 12 occurs. In making installations for wiping the region where the two resulting arcuate surfaces merge, it is necessary to modify the support for the shaft 29 so that in addition to the angle made by the shaft as in a vertical plane (Figs. 1 and 2) a further angular relationship is provided as indicated at a, Fig. 6. In other words, the shaft has a compound angular relationship to the driving element 28, one serving to cause the blade to nearly follow one portion of the panel and the other serving to maintain the blade in proper position to nearly follow the merging portion of different curvature. The angle a is shown much greater than usually is necessary.

I claim:

1. In a windshield wiper mechanism for wiping a curved surface, a power supply unit having a power take-off shaft normal to the principal plane of said surface, a housing having attaching flange means parallel to or in said principal plane, a universal joint means in said housing having permanently non-aligned input and output portions separable solely by movement of said portions out of proximity to each other, said means forming a driving connection between said power take-off shaft and said output portion, and a wiper blade drive arm secured to said output shaft.

2. A windshield wiper drive mechanism unit for use in wiping curved windshield surfaces, said unit comprising a housing having an attaching base portion and a rigid tubular bearing portion for the shaft, said tubular portion being oblique to the principal plane of the base portion whereby with the base portion secured adjacent one side of the windshield framework a wiper arm carried on the shaft may be oscillated by the shaft generally parallel to the curved windshield surface, a drive shaft for the wiper arm supporting shaft, supporting means for the drive shaft arranged to be detachably mounted at opposite side of the framework in registration with said base portion and to then maintain the drive shaft with its axis normal to the framework, and means including a universal coupling arranged for one-to-one ratio connection of the shafts, said means constituting a detachable connection between an element of the universal coupling and the drive shaft, said connection being rendered operative to connect the shafts through the coupling consequent upon mounting said supporting means on the framework in the position stated.

3. A wiper arm operating shaft assembly for wiping curved glass supported by framework aligned with or parallel to marginal portions of the glass, said assembly including a drive arm supporting shaft and housing therefor, the latter having an attaching base portion with a face oblique to the axis of the shaft and adapted to be secured flatwise against such framework and a tubular bearing portion projecting rigidly from the base concentric with the shaft, so that when the arm supporting shaft is oscillated a wiper-carrying portion of a drive arm secured rigidly on the shaft will move in a predetermined curved path for wiping the curved surface, a drive shaft and supporting assembly including a second housing having an attaching base portion also arranged for attachment flatwise against such framework on the side opposite said first housing and having a bearing portion for the drive shaft, the axis of the latter bearing portion extending at right angles to the associated base portion, and a universal coupling between said shafts contained in the first mentioned housing.

4. In combination, a mounting bracket arranged to support a windshield wiper drive arm for movement of a wiper carried thereby continuously in wiping contact with a curved transparency having a supporting framework, an operating shaft for such arm, said mounting bracket having a base portion with a mounting face disposed obliquely of the axis of the shaft for attachment against said framework and a tubular bearing portion extending rigidly therefrom supporting the shaft, a generally spherical socket in the base portion, a generally hemispherical head rigid with the operating shaft seated in the socket, said head having diametral open slots extending parallel to each other along the axis of the shaft, a drive shaft extending into the socket approximately perpendicular to the mounting face of the base portion, cylindrical aligned drive pin elements diametrally crosswise of the drive shaft seated in the slots to form a universal drive connection with the head, being readily removable from the slots by movement of the drive shaft axially away from the head, and means engaging and normally holding the drive shaft with the point of intersection of its axis and that of the drive pin elements disposed at the effective center of the socket.

COLUMBUS R. SACCHINI.

REFERENCES CITED

The following references are of record in the file of this patent:

UNITED STATES PATENTS

| Number | Name | Date |
|---|---|---|
| 1,982,624 | Barker | Dec. 4, 1934 |
| 2,079,399 | Draw et al. | May 4, 1937 |
| 2,146,215 | Horton | Feb. 7, 1939 |
| 2,286,449 | Wahlberg | June 16, 1942 |
| 2,351,699 | Parry et al. | June 20, 1944 |
| 2,356,424 | Paton | Aug. 22, 1944 |
| 2,387,564 | Christel | Oct. 23, 1945 |